(12) United States Patent
Bailey

(10) Patent No.: US 6,572,249 B2
(45) Date of Patent: Jun. 3, 2003

(54) BICYCLE LIGHT WITH LED ARRAY

(75) Inventor: Randall B. Bailey, Marshall, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 09/954,248

(22) Filed: Sep. 17, 2001

(65) Prior Publication Data

US 2002/0093825 A1 Jul. 18, 2002

Related U.S. Application Data

(60) Provisional application No. 60/262,607, filed on Jan. 18, 2001.

(51) Int. Cl.$^7$ .................................................. B21J 6/00
(52) U.S. Cl. .................. 362/473; 362/474; 362/240; 362/184; 362/191; 362/249; 362/252; 362/475; 362/545; 362/542; 362/543; 362/544; 362/493
(58) Field of Search ................................ 362/473, 474, 362/240, 184, 191, 252, 545, 249, 475, 542, 543, 544, 493, 236

(56) References Cited

U.S. PATENT DOCUMENTS 3,732,537 A * 5/1973 Freeman ...................... 340/472
4,161,018 A * 7/1979 Briggs et al. ................ 362/104
6,273,596 B1 * 8/2001 Parkyn, Jr. .................. 362/292

OTHER PUBLICATIONS

Quality Bicycle Products, p. 28 of Catalog, Date Unknown.

* cited by examiner

Primary Examiner—Sandra O'Shea
Assistant Examiner—Mark Tsidulko
(74) Attorney, Agent, or Firm—David C Brezina; Barnes & Thornburg

(57) ABSTRACT

A horizontal disk shaped bicycle light has a plurality of illuminating elements arrayed around its circumference, selectively illuminated at slow, medium and fast (or continuously "on") rates and selectively illuminated in an all around or a side and rear only pattern.

14 Claims, 2 Drawing Sheets

BICYCLE LIGHT WITH LED ARRAY

CLAIM OF PRIORITY

This application claims priority based on Provisional Application Serial No. 60/262,607, filed Jan. 18, 2001 and having the same title and inventor.

BACKGROUND OF THE INVENTION

1. Field of the Invention

The invention is a horizontal disk shaped bicycle light with a plurality of illuminating elements preferably of superluminescent Light Emitting Diodes arrayed around its circumference, through a range of about 330 degrees, which elements are selectively illuminated at slow, medium and fast (or continuously "on") rates and also selectively illuminated in an all around or a side and rear only pattern.

2. Description of Related Art

Bicycle tail lights are well known, however these are generally formed in either lozenge shapes or occasionally disk shapes with the faces of the disks arranged vertically. Examples of the former are LED illuminated tail lights of U.S. Pat. No. 5,313,188 issued to Choi on May 17, 1994 and filed Oct. 11, 1989. An example of the latter is U.S. Pat. No. 4,323,879 issued to Kelley on Apr. 6, 1982.

Examples of various flashing light controls include the teachings of Choi, referred to above, which shows the flashing of Superluminescent LEDs (SLD) at frequencies higher than or between the range of 3–12 Hz and at a duty cycle of about 10–60%. U.S. Pat. No. 4,523,258 issued to Morse on Jun. 11, 1985 flashes LEDs powered by a battery with a circuit based on an oscillator using "conventional type 556 dual timer chips" and selecting values for resistors and capacitors for various oscillators so that the output "is on the order of 3 Hz" but may range from "slightly less than 1 Hz" to "not>5 Hz." U.S. Pat. No. 4,156,166 issued to Shapiro illuminates incandescent lights using an oscillator to provide consistent illumination over the life of a progressively discharging battery. U.S. Pat. No. 4,833,725 to Teeter issued May 23, 1989 and flashes a battery powered LED at about 1 to 2 Hz at a duty cycle of about 20 & to conserve power. Kelley, referred to above, also flashes a light, but uses a capacitor and resistor circuit. These materials are incorporated by reference as if fully set forth herein and are typical of design choices available as to frequency and duty cycle which may be made by the person of ordinary skill.

BRIEF DESCRIPTION OF THE PREFERRED EMBODIMENT

The invention is a disk shaped bicycle light using a plurality of outwardly facing, circumferentially spaced conical lenses each having a light emitting diode (LED) at the apex of the cone. Two conical lenses are generally sideward, but slightly forward facing, while three are generally rearwardly facing, specifically, rear facing element, left and right rear elements and left and right forward lenses, to provide generally all-around visibility when all five are energized, and to limit visibility to the side and rear when the rearwardly facing LEDs are illuminated.

DETAILED DESCRIPTION OF THE PREFERRED EMBODIMENT

Figure 1:
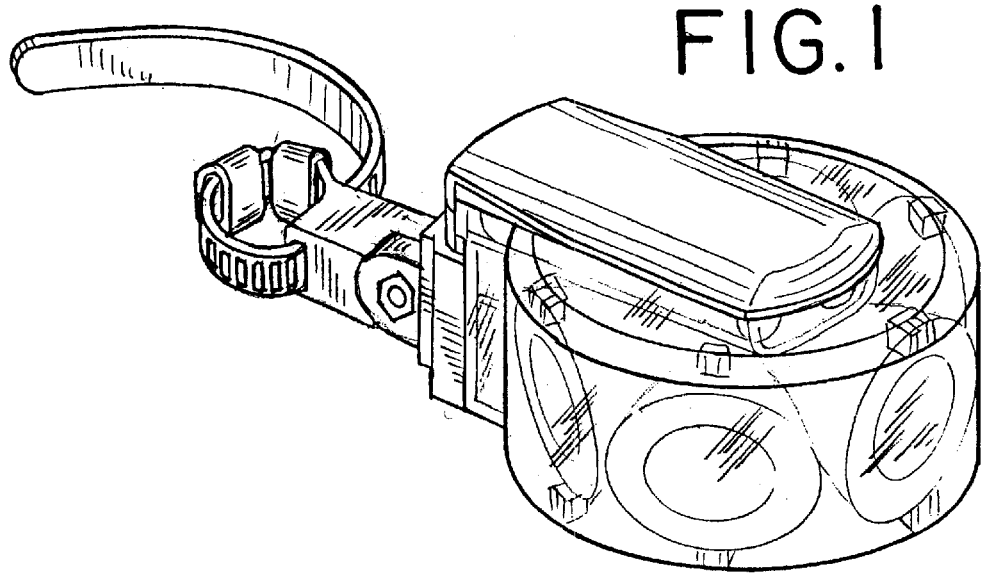
FIG. 1 is a perspective view of my bicycle light.
Figure 2:
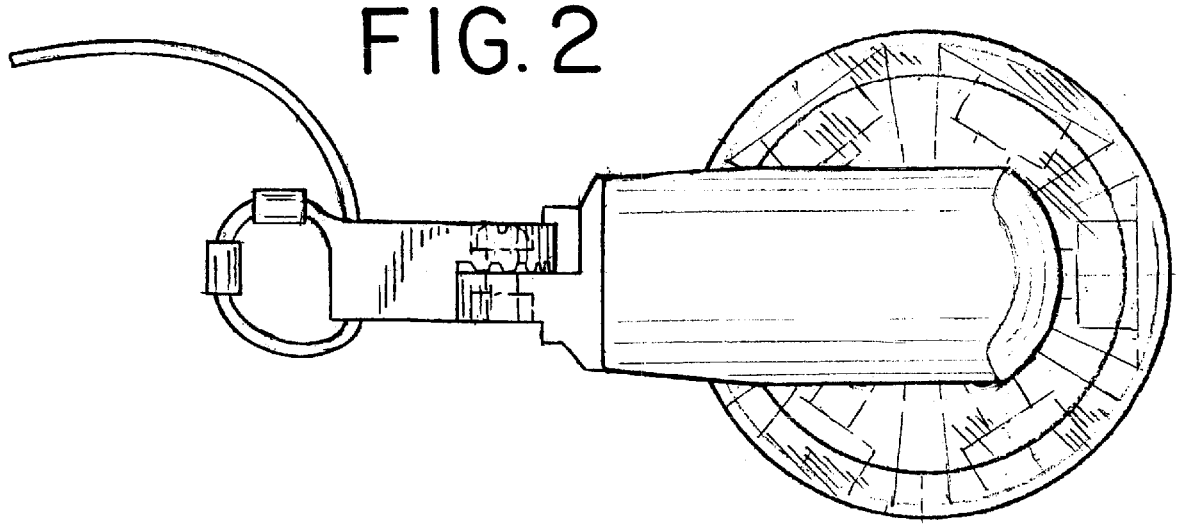
FIG. 2 is a top plan view of my bicycle light.
Figure 3:
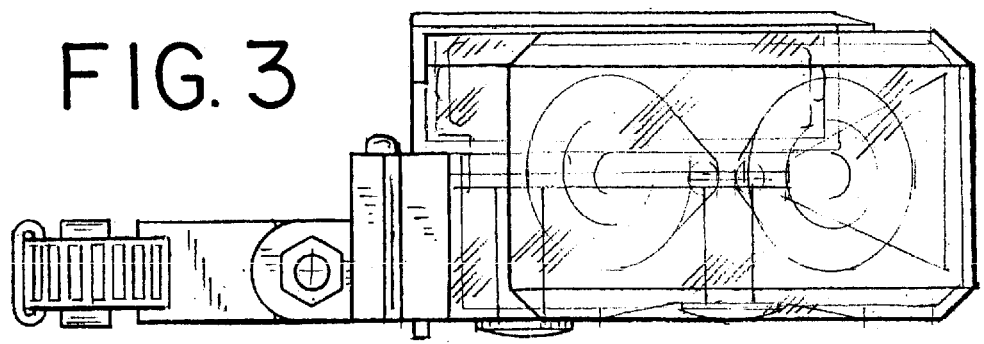
FIG. 3 is a side elevational view of my bicycle light.
Figure 4:
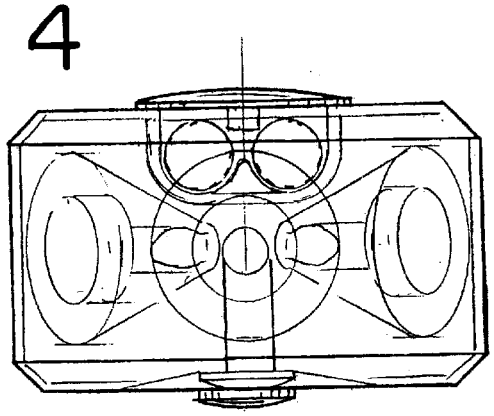
FIG. 4 is a front elevational view of my bicycle light.
Figure 5:
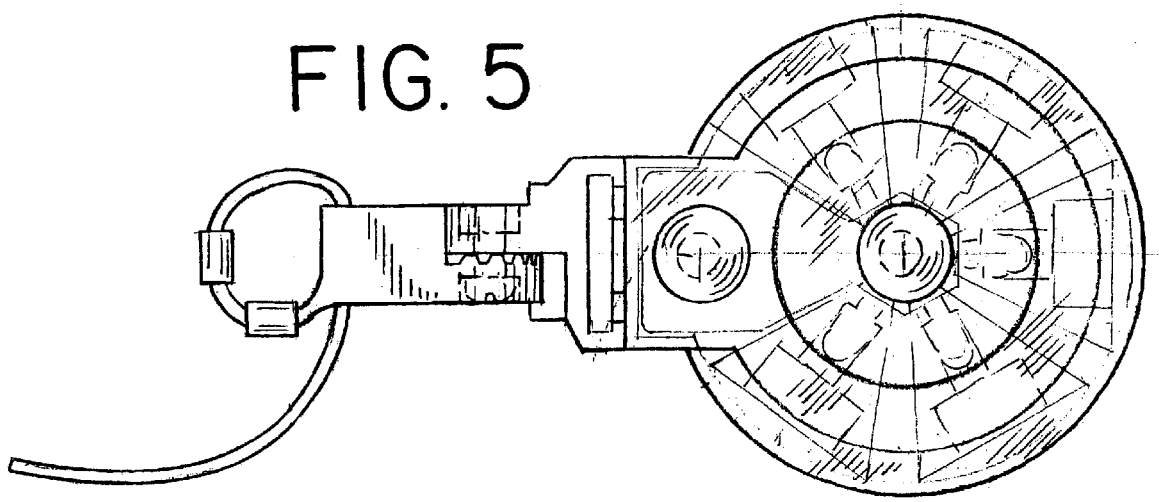
FIG. 5 is a bottom plan view of my bicycle light.
Figure 6:
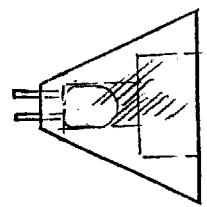
FIG. 6 is a sectional view of a lens unit of my bicycle light.

A bicycle light 10 has a housing 12 supported on a bracket 14 attachable to a bicycle, not shown. Housing 10 is preferably composed of light transmitting plastic, being generally transparent, consistent with the advantageous use of fiber optic related principles as will be more fully described below. Housing 10 is also preferably round, although analogous configurations such as polygonal or ellipsoidal section shapes would accomplish some of the same goals. Housing 10 has a circumferential wall 16 joining a top 18 and bottom 20. Wall 16 has a bracket mount 22 that joins a battery and control bay 24 preferably normal thereto such that bay 24 is formed on top 20. In this form the unit will be referred to as an "LED disk."

Bay 24 has defining side ridges and an ed ridge, which slidably receive cover 32. Contained within bay 24 are conventional batteries, not shown and a control circuit. Circuitry using conventional timers electronically programmed for slow, medium and fast oscillation at frequencies above (fast) and below the threshold of human perception (about 1–10 Hz, and a duty cycle of about 5 to 50%, McCormick, "Human Factors in Engineering and Design" pp 81, 107, 1976) may be used, or the LEDs described below may simply be continuously energized.

Due to miniaturization, the entire control circuit may be contained on a printed circuit type board contained within bay 24 and operatively connected to switches 34, 36 for control as described below. Power switch 34 cycles between "off" and the fast, slow and medium oscillation rates, while mode switch 36 selects the array used.

Beveled top edge 38 and bottom edge 40 are also preferred at the intersection of wall 16 and top 18 and bottom 2, respectively. Bracket 14 has a sliding clamp 42 an angle adjustment mechanism 44 a supporting strut 46 and constricting clamp 48 for affixation to a bicycle.

Contained within housing 12 are a plurality of LED elements preferably five in number. These include rear facing element 50, left and right rear elements 52, 54 and left and right forward elements 56, 58. While LED elements are preferred, the term light emitting devices may be used to connote other illuminating devices now known, such as incandescent or energized gas 'bulbs' and such substantial equivalents as may meet the energy usage and illumination requirements of the disk in the future.

Each of the elements 50, 52, 54, 56 and 58, while oriented in the manner described, is formed in a substantially similar shape for maximum optical effectiveness. A shaped lens 60 diverges from a conical base 62 having a flat surface 64 formed to define a LED receiving aperture 66.

The shape of the elements is advantageous, in that when viewed from an angle close to their designed direction, they present a 'bull's-eye' pattern in that the lenses 60 terminate in ring surfaces 70 and therefore emit light in the manner of fiber optic principles, while the LED 72 in aperture 66 is also visible as an illuminated circle contained within an illuminated ring 70. The conical shape enables a moderately large ring given the dimensions of the body 12. Further, the relatively large ring shapes also provides for a greater visibility at angles considerably diverging from the designed directions of rear facing, left and right rear and left and right forward directions. When all illuminated, the rings 70 and LED's 72 will be visible through about 330°.

The power switch cycles through four positions, in the order of: "off", slow, medium and fast or continuously "on." Once the desired performance has been defined, a person of ordinary skill in the LED control field can design switching and control to effectuate these principles. The various LED flashing devices described above are examples of the circuits that could be used, although it is not believed that the specific pattern of slow, medium and fast (or continuously "on") is taught or suggested.

The selector switch also cycles through positions, selecting either the three generally rearwardly facing cones, or all the cones. In this manner the generally forwardly facing cones can be disabled, reducing visibility of the light from generally forward directions, reducing power consumption and reversing the effect of forwardly emitted light distracting the rider. It is expected that in some jurisdictions, red colored lights may be permitted to be visible on vehicles only from directions rearward of the sides. It is expected that an LED circuit designer could effectuate these principles. However, it is not believed that the specific front and rear selectivity is taught or suggested. Certainly the combination of slow, medium and fast (or continuously "on") in combination with front and rear selectivity is not taught or suggested.

While the preferred disk uses red LEDs and is intended as a bicycle tail light, other color combinations are not necessarily intended to be excluded, whether for traditional warning purposes or for illumination, as may be a front-facing disk with a white light, or for novelty purposes with other colors. Commonly used combinations of colors include red, white and green navigation lights which might readily be adapted from a disk containing appropriately sized and spaced conical illuminating elements. Accordingly, while a bicycle tail light is preferred, other uses are not necessarily unclaimed herein.

The light is preferably mounted by removing the bracket 14 fixing screw (hidden) with a flat headed screw driver. The fully opened bracket band 48 is then wrapped tightly around the seat post or seat stay in the desired position for mounting on the bicycle, with the bracket facing back in line with the rear tire. The fixing screw is then and the band tightened until secure.

Next, the operator will clip the LED disk body 12 fully onto the bracket 14 at sliding clamp 42. The angle of the bracket is adjusted at 44 so that the LED can be seen clearly by approaching traffic. Preferably, the top 18 and bottom 20 will be generally horizontal. The angle adjustment is accomplished by loosening the adjusting screw in assembly 44, moving and rotating the LED disk body 12 up or down, and then retightening securely in the correct position.

For security against theft from a parked bicycle, or to mount on a different bracket on a different bicycle, the LED can easily be removed by simply depressing a clip quick release button at sliding clamp 42 and pulling the LED off the bracket.

In order for the user to replace the batteries, one will slide the top cover open and insert 2 AAA batteries. Other choices having adequate storage capacity and voltage will be known to one of ordinary skill and can be optimized to a particular circuit used. To close, the user will slide the top cover back in place until tight.

As many and varied modifications of the subject matter of this invention will become apparent to those skilled in the art from the detailed description given above, it will be understood that the present invention is limited only as provided in the claims appended hereto.

In accordance with my invention, I claim:

1. A bicycle light comprising:
a disk shaped body having a circumference;
said body containing a plurality of illuminating elements arrayed around said circumference;
a control circuit contained within said body;
said control circuit being formed and arranged such that said illuminating elements may be selectively illuminated at a plurality of rates;
said illuminating elements each having a shaped lens;
said lens having a conical base extending circumferentially outwardly and terminating in a flat surface;
said base extending outwardly from an aperture adapted to receive a light emitting device,
said lens operating by the conduction of light from the light emitting device through the conical base, the light emitting from said flat surface.

2. The light of claim 1 further comprising:
said illuminating elements being adapted to be selectively illuminated in a plurality of patterns.

3. The light of claim 2 further comprising:
said patterns including a first pattern in which said elements are illuminated substantially an all around said circumference and a second pattern in which said elements are illuminated in a side and rear only pattern.

4. The light of claim 3 further comprising:
said patterns including a first pattern in which said elements are illuminated substantially an all around said circumference and a second pattern in which said elements are illuminated in a side and rear only pattern.

5. The light of claim 4 further comprising:
said first pattern including a plurality of slightly forwardly facing illuminating elements;
said first pattern extending substantially 330 degrees around said circumference such that said flat surfaces of said forwardly facing illuminating elements and said light emitting devices are visible from a position forward of a perpendicular to a side of a bicycle on which said light is mounted.

6. The light of claim 1 further comprising:
said rates including at least a slow, medium and fast rate in which said fast rate is sufficiently fast to be visually perceptibly continuously "on" to an ordinary observer.

7. The light of claim 1 further comprising:
said rates including at least a flashing rate and fast rate in which said fast rate is one of either sufficiently fast to be visually perceptibly continuously "on" to an ordinary observer or is continually illuminated.

8. The light of claim 7 further comprising:
said illuminating elements each having a shaped lens;
said lens having a conical base extending circumferentially outwardly and terminating in a flat surface;
said base extending outwardly from an aperture adapted to receive a light emitting device.

9. The light of claim 8 further comprising:
said patterns including a first pattern in which said elements are illuminated substantially an all around said circumference and a second pattern in which said elements are illuminated in a side and rear only pattern.

10. The light of claim 9 further comprising:
said first pattern including a plurality of slightly forwardly facing illuminating elements;
said first pattern extending substantially 330 degrees around said circumference such that said flat surfaces of said forwardly facing illuminating elements and said light emitting devices are visible from a position forward of a perpendicular to a side of a bicycle on which said light is mounted.

11. A disk shaped light for a bicycle, the bicycle having a first direction of travel corresponding to the direction in which a balanced rider propels the bicycle, and a second direction opposite said first direction and sideward directions perpendicular to the first direction comprising:

a plurality of outwardly facing, circumferentially spaced conical lenses;

each of said lenses having a light emitting device at the apex of the cone;

two of said conical lenses are aligned in a generally sideward, but slightly facing said first direction;

three of said conical lenses are aligned generally facing said second direction;

said alignment of said lenses providing generally all-around visibility when all five are energized, and to limit visibility to the side and second direction when only the second direction facing LEDs are illuminated;

said light having a control circuit;

said control circuit controlling the pattern of illumination of said elements selectively between an all around pattern in which all five devices are illuminated and a generally second direction aligned pattern in which said three generally second direction and sideward devices only are illuminated.

12. The light of claim 11 further comprising:

said control circuit controlling the pattern of illumination of said elements selectively between a plurality of rates including at least said rates including at least a flashing rate and fast rate in which said fast rate is one of either sufficiently fast to be visually perceptibly continuously "on" to an ordinary observer or is continually illuminated.

13. A disk shaped bicycle light comprising:

control means for controlling the rate and pattern of illumination of the bicycle light;

power means for energizing the bicycle light;

illuminating means for illuminating said light in accordance with a selected pattern and rate;

lens means associated with each of said illuminating means for dispersing light emitted by said illuminating means for an increased apparent size and greater angular direction;

wherein five of said illuminating means and lens means are illuminated in a first pattern and three of said illuminating means and lens means are lighted selectively in a second pattern such that in said first pattern a total of five lens means dispersed horizontally about the periphery of said disk are illuminated and in said second pattern three of said lens means one dispersed rearwardly and two dispersed sidewardly are illuminated;

said lens means each having a conically shaped lens;

said lens means having a conical base extending circumferentially outwardly and terminating in a flat surface;

said base extending outwardly from an aperture adapted to receive a light emitting device;

said lens means operating by the conduction of light from the light emitting device through the conical base, the light emitting from said flat surface.

14. The light of claim 13 further comprising:

said control means illuminating the illuminating means at selected rates;

said rates including at least a flashing rate and fast rate in which said fast rate is one of either sufficiently fast to be visually perceptibly continuously "on" to an ordinary observer or is continually illuminated.

* * * * *